United States Patent
Yamane et al.

(10) Patent No.: US 6,951,956 B2
(45) Date of Patent: Oct. 4, 2005

(54) CRYSTALLINE POLYGLYCOLIC ACID, POLYGLYCOLIC ACID COMPOSITION AND PRODUCTION PROCESS THEREOF

(75) Inventors: Kazuyuki Yamane, Fukushima (JP); Hiromitsu Miura, Fukushima (JP); Toshihiko Ono, Fukushima (JP); Junji Nakajima, Ibaraki (JP); Daisuki Itoh, Ibaraki (JP)

(73) Assignee: Kureha Kagaku Kogyo K.K.

( * ) Notice: Subject to any disclaimer, the term of this patent is extended or adjusted under 35 U.S.C. 154(b) by 4 days.

(21) Appl. No.: 10/132,578

(22) Filed: Apr. 25, 2002

(65) Prior Publication Data

US 2003/0125431 A1 Jul. 3, 2003

Related U.S. Application Data

(63) Continuation-in-part of application No. 10/002,792, filed on Nov. 2, 2001, now abandoned.

(30) Foreign Application Priority Data

Oct. 31, 2001 (JP) ........................................ 2001-335443
Jan. 16, 2002 (JP) ........................................ 2002-007839

(51) Int. Cl.⁷ .............................................. C07C 59/10
(52) U.S. Cl. ....................................... 562/587; 562/580
(58) Field of Search ........................ 562/579; 566/185, 566/187, 189, 179; 260/535

(56) References Cited

U.S. PATENT DOCUMENTS 2,668,162 A  2/1954 Lowe et al.
3,297,033 A  1/1967 Schmitt et al.
5,853,639 A  12/1998 Kawakami et al.
6,001,439 A  12/1999 Kawakami et al.
6,159,416 A  12/2000 Kawakami et al.
6,245,437 B1 * 6/2001 Shiiki et al. ................ 428/483

FOREIGN PATENT DOCUMENTS

| JP | 10-60136 | 3/1998 |
| JP | 10-80990 | 3/1998 |
| JP | 10-138371 | 5/1998 |
| JP | 10-337772 | 12/1998 |

OTHER PUBLICATIONS

Advances in Biomaterials (1982), 3, 781–6.*

* cited by examiner

*Primary Examiner*—Johann Richter
*Assistant Examiner*—Karl Puttlitz
(74) *Attorney, Agent, or Firm*—Dinsmore & Shohl LLP

(57) ABSTRACT

Crystalline polyglycolic acid wherein a difference between the melting point Tm and the crystallization temperature $Tc_2$ is not lower than 35° C., and a difference between the crystallization temperature $Tc_1$ and the glass transition temperature Tg is not lower than 40° C. A production process of polyglycolic acid modified in crystallinity, comprising applying heat history to crystalline polyglycolic acid at a temperature of not lower than (the melting point Tm of the crystalline polyglycolic acid+38° C.). A polyglycolic acid composition comprising crystalline polyglycolic acid and a heat stabilizer, wherein a difference ($T_2-T_1$) between the temperature $T_2$ at 3%-weight loss on heating of the polyglycolic acid composition and the temperature $T_1$ at 3%-weight loss on heating of the crystalline polyglycolic acid is not lower than 5° C.

22 Claims, 2 Drawing Sheets

CRYSTALLINE POLYGLYCOLIC ACID, POLYGLYCOLIC ACID COMPOSITION AND PRODUCTION PROCESS THEREOF

RELATED APPLICATION

The present application is a continuation-in-part of application Ser. No. 10/002,792 filed Nov. 2, 2001 now abandoned.

FIELD OF THE INVENTION

The present invention relates to polyglycolic acid (including polyglycolide) modified in thermal properties such as crystallinity, and a production process thereof. The polyglycolic acid according to the present invention is excellent in melt processability, stretch processability, etc., and is suitable for use as a polymer material for, for example, sheets, films, fibers, blow molded products, composite materials (multi-layer films, multi-layer containers, etc.) and other molded or formed products. The present invention also relates to a polyglycolic acid composition which is so excellent in melt stability that generation of gasses attributable to low-molecular weight products produced upon melting is prevented, and a production process thereof. The present invention further relates to a process for controlling the crystallinity of polyglycolic acid.

BACKGROUND OF THE INVENTION

Polyglycolic acid is known to be degraded by microorganisms or enzymes present in the natural world such as soil and sea because it contains aliphatic ester linkages in its molecular chain. In recent years, the disposal of plastic waste has become a great problem with the increase of plastic products. Polyglycolic acid attracts attention as a biodegradable polymer material which scarcely imposes burden on the environment. The polyglycolic acid has intravital absorbability and is also utilized as a medical polymer material for surgical sutures, artificial skins, etc. (U.S. Pat. No. 3,297,033).

Polyglycolic acid can be produced by dehydration polycondensation of glycolic acid, dealcoholization polycondensation of an alkyl glycolate, desalting polycondensation of a glycolic acid salt or the like. Polyglycolic acid can also be produced by a process comprising synthesizing glycolide, which is a bimolecular cyclic ester (also referred to as "cyclic dimer") of glycolic acid and subjecting the glycolide to ring-opening polymerization. According to the ring-opening polymerization process of glycolide, high-molecular weight polyglycolic acid can be produced with good efficiency.

Since polyglycolic acid is excellent in heat resistance, gas barrier properties, mechanical strength, etc. compared with other biodegradable polymer materials such as aliphatic polyesters, its new uses have been developed as sheets, films, containers, injection-molded products, etc. [Japanese Patent Application Laid-Open No. 10-60136 (U.S. Pat. No. 5,853,639), Japanese Patent Application Laid-Open No. 10-80990 (U.S. Pat. No. 6,245,437), Japanese Patent Application Laid-Open No. 10-138371, and Japanese Patent Application Laid-Open No. 10-337772 (U.S. Pat. Nos. 6,001,439 and 6,159,416)].

However, the production techniques of the polyglycolic acid is not sufficiently established compared with the general-purpose polymer materials, and so its thermal properties are not always suitable for melt processing, stretch processing, etc. The polyglycolic acid is insufficient in melt stability, for example, in that it tends to generate gasses upon its melt processing.

A homopolymer of polyglycolic acid, and copolymer containing a repeating unit derived from polyglycolic acid in a high proportion are crystalline polymers. Such a crystalline polyglycolic acid is high in crystallization temperature $Tc_2$ detected in the course of its cooling from a molten state by means of a differential scanning colorimeter (DSC) and relatively small in a temperature difference $(Tm-Tc_2)$ between the melting point Tm and the crystallization temperature $Tc_2$ thereof. A polymer small in this temperature difference generally has a merit, upon injection molding, that the injection cycle thereof can be enhanced attributable to its fast crystallization speed. However, such a polymer is easy to crystallize upon its cooling from a molten state when it is extruded into a sheet, film, fiber or the like and it is difficult to get an amorphous preform, and so it is difficult to provide any transparent formed product.

The crystalline polyglycolic acid is small in a temperature difference $(Tc_1-Tg)$ between a crystallization temperature $Tc_1$ detected in the course of heating of its amorphous substance by means of DSC and the glass transition temperature Tg thereof. A polymer small in this temperature difference generally involves a problem that a stretchable temperature range is narrow upon stretching of a sheet, film, fiber or the like formed from such a polymer, or stretch blow molding of the polymer.

Therefore, the melt processing or stretch processing using a conventional crystalline polyglycolic acid has involved a problem that forming conditions such as forming temperature or stretching temperature are limited to narrow ranges.

Specifically, the present inventors produced polyglycolic acid in accordance with the production process disclosed in Example 1 of U.S. Pat. No. 2,668,162 to investigate the thermal properties of this polyglycolic acid by means of DSC. As a result, its melting point Tm was about 222° C., while its crystallization temperature $Tc_2$, which is an exothermic peak temperature attributable to crystallization when cooling it at a cooling rate of 10° C./min from a molten state at 252° C. higher by 30° C. than the melting point, was 192° C. Accordingly, a temperature difference $(Tm-Tc_2)$ between the melting point Tm and the crystallization temperature $Tc_2$ of this polyglycolic acid is about 30° C.

The polyglycolic acid was heated to 252° C. and then held by a press cooled with water to 23° C. to produce a cooled sheet. As a result, the crystallization of the polyglycolic acid was observed on the sheet, and no transparent amorphous sheet was able to be obtained. A transparent amorphous sheet (amorphous film) was able to be obtained with difficulty by melting and pressing the polyglycolic acid and then quenching the resulting sheet in ice water kept at about 4° C. Its crystallization temperature $Tc_1$ detected in the course of heating of such an amorphous sheet by means of DSC was measured. As a result, it was about 75° C., and its glass transition temperature was about 40° C. Accordingly, a temperature difference $(Tc_1-Tg)$ between the crystallization temperature $Tc_2$ and the glass transition temperature Tg thereof is about 35° C.

Further, polyglycolic acid is not sufficient in melt stability and has a tendency to easily generate gasses upon its melt processing. More specifically, in the conventional polyglycolic acid, a temperature at which the weight loss upon heating reaches 3% is about 300° C. In addition, it has been found that many of additives such as a catalyst deactivator, a nucleating agent, a plasticizer and an antioxidant deteriorate the melt stability of polyglycolic acid. When the melt stability of polyglycolic acid is insufficient, forming or molding conditions such as forming or molding temperature are limited to narrow ranges, and the quality of the resulting formed or molded product is easy to be deteriorated.

OBJECTS AND SUMMARY OF THE INVENTION

It is an object of the present invention to provide a polyglycolic acid modified in thermal properties such as crystallinity, and a production process thereof.

Another object of the present invention is to provide a polyglycolic acid composition which is so excellent in melt stability that generation of gasses upon its melting is prevented, and a production process thereof.

A further object of the present invention is to provide a polyglycolic acid composition which is excellent in melt stability and modified in thermal properties such as crystallinity, and a production process thereof.

A still further object of the present invention is to provide a process for controlling the crystallinity of polyglycolic acid.

The present inventors have carried out an extensive investigation with a view toward achieving the above objects. As a result, it has been found that heat history at a high temperature of not lower than (the melting point Tm of polyglycolic acid+38° C.) is applied to polyglycolic acid, whereby a temperature difference (Tm−Tc$_2$) between the melting point Tm and the crystallization temperature Tc$_2$ and a temperature difference (Tc$_1$−Tg) between the crystallization temperature Tc$_1$ and the glass transition temperature Tg can be markedly widened.

Polyglycolic acid has heretofore been considered to be poor in melt stability and easy to cause thermal decomposition and coloring under high-temperature conditions. Therefore, when the polyglycolic acid has been formed or molded, it has been melt-processed at a temperature of higher than the melting point Tm (about 220° C.), but not higher than (Tm+at most 30° C.) (for example, about 250° C.). Accordingly, the fact that the thermal properties of the polyglycolic acid, such as crystallinity, can be modified as described above by subjecting the polyglycolic acid to a heat treatment at a temperature far higher than the melting point Tm thereof is unexpectable even by a person skilled in the art and surprising.

In the polyglycolic acid according to the present invention, a temperature difference between the melting point Tm and the crystallization temperature Tc$_2$ is not lower than 35° C., preferably not lower than 40° C., and a temperature difference between the crystallization temperature Tc$_1$ and the glass transition temperature Tg is not lower than 40° C., preferably not lower than 45° C. The use of such a polyglycolic acid modified in thermal properties permits the easy provision of films, sheets, fibers, etc. excellent in transparency and facilitates its stretch processing.

Further, it has been found that a compound serving as a heat stabilizer is selected, thereby providing a polyglycolic acid composition comprising crystalline polyglycolic acid and the heat stabilizer added thereto, wherein a difference (T$_2$−T$_1$) between the temperature T$_2$ at 3%-weight loss on heating of the polyglycolic acid composition and the temperature T$_1$ at 3%-weight loss on heating of the polyglycolic acid is not lower than 5° C.

When the method in which heat history is applied to polyglycolic acid and the method in which the heat stabilizer is added to crystalline polyglycolic acid is used in combination, a polyglycolic acid composition modified in thermal properties and moreover improved in melt stability can be provided. Heat history is applied to polyglycolic acid within a temperature range higher than the melting point Tm thereof, but not higher than (Tm+100° C.), whereby the crystallinity of the polyglycolic acid, such as crystallization temperature Tc$_2$ can be optionally controlled. The present invention has been led to completion on the basis of these findings.

According to the present invention, there is thus provided crystalline polyglycolic acid, wherein (a) a difference (Tm−Tc$_2$) between the melting point Tm defined as a maximum point of an endothermic peak attributable to melting of a crystal detected in the course of heating at a heating rate of 10° C./min by means of a differential scanning calorimeter and the crystallization temperature Tc$_2$ defined as a maximum point of an exothermic peak attributable to crystallization detected in the course of cooling from a molten state at a cooling rate of 10° C./min is not lower than 35° C., and (b) a difference (Tc$_1$−Tg) between the crystallization temperature Tc$_1$ defined as a maximum point of an exothermic peak attributable to crystallization detected in the course of heating an amorphous sheet at a heating rate of 10° C./min by means of a differential scanning colorimeter and the glass transition temperature Tg defined as a temperature at a second-order transition point on a calorimetric curve detected in said course is not lower than 40° C.

According to the present invention, there is also provided a process for producing crystalline polyglycolic acid, wherein (a) a difference (Tm−Tc$_2$) between the melting point Tm defined as a maximum point of an endothermic peak attributable to melting of a crystal detected in the course of heating at a heating rate of 10° C./min by means of a differential scanning colorimeter and the crystallization temperature Tc$_2$ defined as a maximum point of an exothermic peak attributable to crystallization detected in the course of cooling from a molten state at a cooling rate of 10° C./min is not lower than 35° C., and (b) a difference (Tc$_1$−Tg) between the crystallization temperature Tc$_1$ defined as a maximum point of an exothermic peak attributable to crystallization detected in the course of heating an amorphous sheet at a heating rate of 10° C./min by means of a differential scanning colorimeter and the glass transition temperature Tg defined as a temperature at a second-order transition point on a calorimetric curve detected in said course is not lower than 40° C., the process comprising applying heat history to crystalline polyglycolic acid at a temperature of not lower than (the melting point Tm of the crystalline polyglycolic acid+38° C.).

According to the present invention, there is further provided a polyglycolic acid composition comprising crystalline polyglycolic acid and a heat stabilizer, wherein the crystalline polyglycolic acid is crystalline polyglycolic acid, wherein (a) a difference (Tm−Tc$_2$) between the melting point Tm defined as a maximum point of an endothermic peak attributable to melting of a crystal detected in the course of heating at a heating rate of 10° C./min by means of a differential scanning calorimeter and the crystallization temperature Tc$_2$ defined as a maximum point of an exothermic peak attributable to crystallization detected in the course of cooling from a molten state at a cooling rate of 10° C./min is not lower than 35° C., and (b) a difference (Tc$_1$–Tg) between the crystallization temperature Tc$_1$ defined as a maximum point of an exothermic peak attributable to crystallization detected in the course of heating an amorphous sheet at a heating rate of 10° C./min by means of a differential scanning colorimeter and the glass transition temperature Tg defined as a temperature at a second-order transition point on a calorimetric curve detected in said course is not lower than 40° C., and wherein (c) a difference (T$_2$–T$_1$) between the temperature T$_2$ at 3%-weight loss on heating of the polyglycolic acid composition and the temperature T$_1$ at 3%-weight loss on heating of the polyglycolic acid is not lower than 5° C.

According to the present invention, there is still further provided a polyglycolic acid composition comprising crystalline polyglycolic acid and a heat stabilizer, wherein a difference (T$_2$–T$_1$) between the temperature T$_2$ at 3%-weight loss on heating of the polyglycolic acid composition and the temperature T$_1$ at 3%-weight loss on heating of the crystalline polyglycolic acid is not lower than 5° C.

According to the present invention, there is yet still further provided a process for producing a polyglycolic acid composition which comprises crystalline polyglycolic acid, wherein (i) a difference (Tm–Tc$_2$) between the melting point Tm defined as a maximum point of an endothermic peak attributable to melting of a crystal detected in the course of heating at a heating rate of 10° C./min by means of a differential scanning colorimeter and the crystallization temperature Tc$_2$ defined as a maximum point of an exothermic peak attributable to crystallization detected in the course of cooling from a molten state at a cooling rate of 10° C./min is not lower than 35° C., and wherein (ii) a difference (T$_2$–T$_1$) between the temperature T$_2$ at 3%-weight loss on heating of the polyglycolic acid composition and the temperature T$_1$ at 3%-weight loss on heating of the polyglycolic acid is not lower than 5° C., the process comprising applying heat history to a polyglycolic acid composition containing crystalline polyglycolic acid and a heat stabilizer at a temperature of not lower than (the melting point Tm of the crystalline polyglycolic acid+38° C.).

According to the present invention, there is yet still further provided a process for controlling the crystallinity of crystalline polyglycolic acid, comprising applying heat history to the crystalline polyglycolic acid for 1 to 100 minutes within a temperature range higher than the melting point Tm thereof, but not higher than (Tm+100° C.).

BRIEF DESCRIPTION OF THE DRAWINGS

FIG. 1(a) indicates an endothermic peak (Tm) in the course of heating, FIG. 1(b) indicates an exothermic peak (Tc$_2$) in the course of cooling, and FIG. 1(c) indicates a second-order transition point (Tg), an exothermic peak (Tc$_1$) and an endothermic peak (Tm) in the course of heating.

FIG. 2(a) indicates an endothermic peak (Tm) in the course of heating, FIG. 2(b) indicates an exothermic peak (Tc$_2$) in the course of cooling, and FIG. 2(c) indicates a second-order transition point (Tg), an exothermic peak (Tc$_1$) and an endothermic peak (Tm) in the course of heating.

PREFERRED EMBODIMENTS OF THE INVENTION

Figure 1:
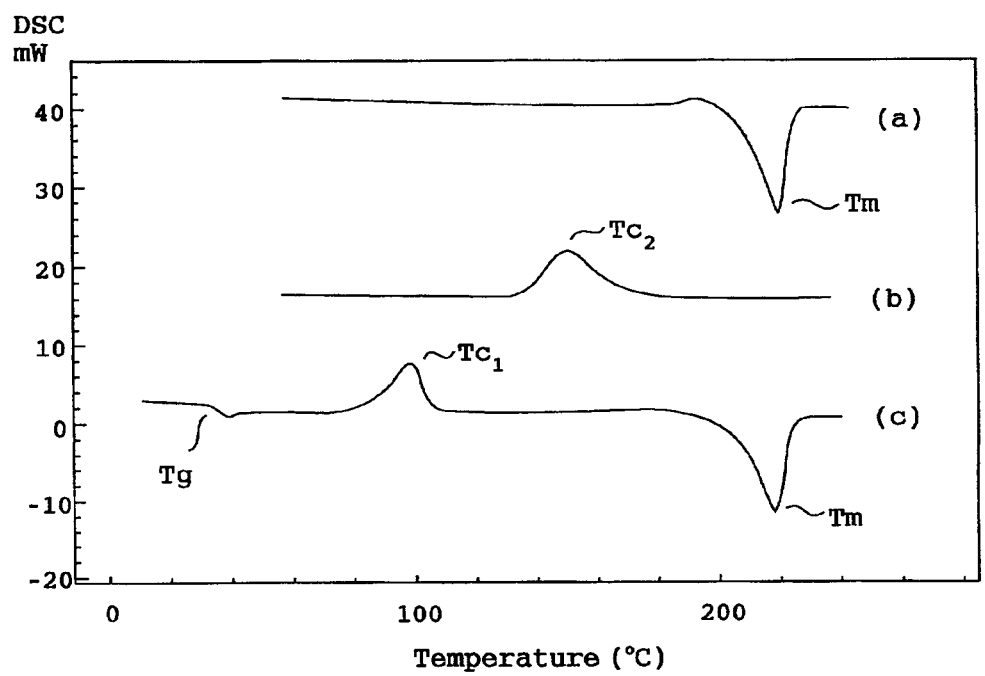
FIG. 1 illustrates calorimetric curves by DSC of polyglycolic acid modified in thermal properties according to the present invention.

1. Polyglycolic Acid:

The polyglycolic acid useful in the practice of the present invention is a homopolymer or copolymer having a repeating unit represented by the formula (I):

The proportion of the repeating unit represented by the formula (I) contained in the polyglycolic acid is preferably at least 55 wt. %, more preferably at least 70 wt. %, particularly preferably at least 90 wt. %. If the content of the recurring units represented by the formula (I) is too low, the properties inherent in the polyglycolic acid, such as gas barrier properties, heat resistance and crystallinity, are impaired.

The polyglycolic acid according to the present invention is a crystalline polymer having a melting point. Such a polyglycolic acid can be produced by a process in which glycolic acid, an alkyl glycolate or a glycolic acid salt is polycondensed.

As shown in the formula (II):

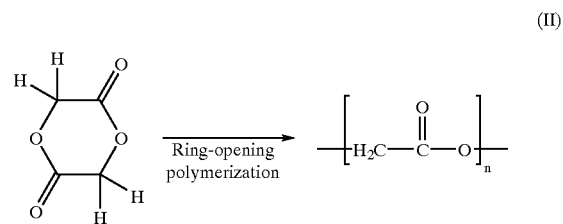

the polyglycolic acid can be produced by subjecting glycolide, which is a bimolecular cyclic ester of glycolic acid to ring-opening polymerization. The ring-opening polymerization is preferably conducted in the presence of a small amount of a catalyst. No particular limitation is imposed on the catalyst. As examples thereof, may be mentioned tin compounds such as tin halides (for example, tin dichloride, tin tetrachloride, etc.) and tin organic carboxylates (for example, tin octanoate and tin octylate); titanium compounds such as alkoxytitanates; aluminum compounds such as alkoxyaluminum; zirconium compounds such as zirconium acetylacetone; and antimony compounds such as antimony halides and antimony oxide.

When high strength is required of, particularly, a formed product such as a sheet, film or fiber, a ring-opening polymerization process of glycolide, by which a polymer having a relatively high molecular weight is easy to be obtained, is preferably adopted as a synthetic process of the polyglycolic acid. A homopolymer (i.e., polyglycolide) of polyglycolic acid can be obtained by subjecting glycolide to ring-opening polymerization by itself.

In order to produce a copolymer of glycolic acid as the polyglycolic acid, a monomer such as glycolide or glycolic acid is copolymerized with various kinds of comonomers. As examples of the comonomers, may be mentioned cyclic monomers such as ethylene oxalate (i.e., 1,4-dioxane-2,3- dione), lactide, lactones (for example, β-propiolactone, β-butyrolactone, pivalolactone, γ-butyrolactone, δ-valerolactone, β-methyl-δ-valerolactone, ε-caprolactone, etc.), trimethylene carbonate and 1,3-dioxane; hydroxycarboxylic acids such as lactic acid, 3-hydroxypropanoic acid, 3-hydroxybutanoic acid, 4-hydroxybutanoic acid and 6-hydroxycaproic acid, and alkyl esters thereof; substantially equimolar mixtures of an aliphatic diol such as ethylene glycol or 1,4-butanediol and an aliphatic dicarboxylic acid such as succinic acid or adipic acid or an alkyl ester thereof; and two or more compounds thereof. Glycolide and glycolic acid may also be used in combination.

Among these, the cyclic compounds such as lactide, caprolactone and trimethylene carbonate; and the hydroxycarboxylic acids such as lactic acid are preferred in that they are easy to be copolymerized, and a copolymer excellent in physical properties is easy to be obtained. The comonomer is generally used in a proportion of at most 45 wt. %, preferably at most 30 wt. %, more preferably at most 10 wt. % based on all monomers charged. When the proportion of the comonomer is high, the crystallinity of the resulting polymer is liable to be impaired. When the crystallinity of polyglycolic acid is impaired, its heat resistance, gas barrier properties, mechanical strength, etc. are deteriorated.

A polymerizer for the crystalline polyglycolic acid may be suitably selected from among various kinds of apparatus such as extruder type, vertical type having a paddle blade, vertical type having a helical ribbon blade, holizontal type such as an extruder type or kneader type, ampoule type tube and flat plate (such as quadrangle, especially, rectangle) type.

The polymerization temperature can be preset within a range of from 120° C., which is a substantial polymerization-initiating temperature, to 300° C. as necessary for the end application intended. The polymerization temperature is preferably 130 to 250° C., more preferably 140 to 220° C., particularly preferably 150 to 200° C. If the polymerization temperature is too high, a polymer formed tends to undergo thermal decomposition. The polymerization time is within a range of from 3 minutes to 20 hours, preferably from 15 minutes to 18 hours. If the polymerization time is too short, it is hard to sufficiently advance the polymerization. If the time is too long, the resulting polymer tends to be colored.

In order to form or mold the polyglycolic acid into a sheet, film, bottle or the like, its solid is preferably shaped in the form of pellets even in particle size. The melting temperature of the polyglycolic acid is controlled in a pelletizing step, whereby polyglycolic acid controlled in crystallinity can be obtained without greatly changing the process.

2. Modified Polyglycolic Acid:

In the crystalline polyglycolic acid according to the present invention, a difference (Tm–$Tc_2$) between the melting point Tm defined as a maximum point of an endothermic peak attributable to melting of a crystal detected in the course of heating at a heating rate of 10° C./min by means of DSC and the crystallization temperature $Tc_2$ defined as a maximum point of an exothermic peak attributable to crystallization detected in the course of cooling from a molten state at a cooling rate of 10° C./min is not lower than 35° C. Besides, in the crystalline polyglycolic acid according to the present invention, a difference ($Tc_1$–Tg) between the crystallization temperature $Tc_1$ defined as a maximum point of an exothermic peak attributable to crystallization detected in the course of heating an amorphous sheet at a heating rate of 10° C./min by means of DSC and the glass transition temperature Tg defined as a temperature at a second-order transition point on a calorimetric curve detected in said course is not lower than 40° C.

The numerical values indicating the thermal properties in the present invention are values measured by means of a differential scanning calorimeter (DSC; TC-10A) manufactured by METTLER INSTRUMENT AG. Description is given in the light of a more specific measuring method. The melting point in the present invention means a temperature indicating a maximum point of an endothermic peak attributable to melting of a crystal, which appears on a calorimetric curve when heated from 50° C. at a heating rate of 10° C./min under a nitrogen atmosphere by means of DSC [FIG. 1(a)].

The crystallization temperature $Tc_2$ in the present invention means a temperature indicating a maximum point of an exothermic peak attributable to crystallization, which appears on a calorimetric curve when heated from 50° C. to a temperature higher by 30° C. than the melting point, at which the peak attributable to the melting of a crystal disappears, at a heating rate of 10° C./min under a nitrogen atmosphere by means of DSC, held for 2 minutes at that temperature and then cooled at a cooling rate of 10° C./min [FIG. 1(b)].

The crystallization temperature $Tc_1$ in the present invention means a temperature indicating a maximum point of an exothermic peak attributable to crystallization, which appears on a calorimetric curve when heating an amorphous film in a transparent solid state, which has been obtained by preheating polyglycolic acid at 240° C. for 30 seconds, pressing it for 15 seconds under a pressure of 5 MPa to prepare a film (sheet) and immediately pouring this film into ice water to cool it, from –50° C. at a heating rate of 10° C./min under a nitrogen atmosphere by means of DSC [FIG. 1(c)].

The glass transition temperature Tg in the present invention means a temperature at a second-order transition point (on set), which appears on a calorimetric curve when heating an amorphous film in a transparent solid state, which has been obtained by preheating polyglycolic acid at 240° C. for 30 seconds, pressing it for 15 seconds under a pressure of 5 MPa to prepare a film (sheet) and immediately pouring this film into ice water to cool it, from –50° C. at a heating rate of 10° C./min under a nitrogen atmosphere by means of DSC [FIG. 1(c)].

The polyglycolic acid modified in thermal properties such as crystallinity in the present invention is crystalline polyglycolic acid, wherein a temperature difference (Tm–$Tc_2$) between the melting point Tm and the crystallization temperature $Tc_2$ is not lower than 35° C., preferably not lower than 40° C., more preferably not lower than 50° C., particularly preferably not lower than 60° C. If this temperature difference is too small, such a polyglycolic acid is easy to crystallize on cooling from a molten state in its melt processing, and so it is difficult to provide a transparent sheet, film, fiber or the like. When the polyglycolic acid is subjected to extrusion processing, it is preferred that this temperature difference be greater. The upper limit of this temperature difference is generally about 100° C., often about 90° C. though it varies according to the composition of the polyglycolic acid.

In the polyglycolic acid modified in thermal properties in the present invention, a temperature difference ($Tc_1$–Tg) between the crystallization temperature $Tc_1$ in the course of the heating and the glass transition temperature Tg is at least 40° C., preferably at least 45° C., particularly preferably at least 50° C. If this temperature difference is too small, a stretchable temperature range is narrow in stretch processing such as stretching of a sheet, film, fiber or the like formed from such a polyglycolic acid, or stretch blow molding of the polyglycolic acid, and so it is difficult to preset proper forming conditions. The stretchable temperature range becomes wider, and stretch processing becomes easier as this temperature difference is greater. The upper limit of this temperature difference is generally about 65° C., often about 60° C.

3. Production Process of Modified Polyglycolic Acid:

The polyglycolic acid modified in thermal properties as described above can be produced by applying heat history to polyglycolic acid at a high temperature of not lower than (the melting point Tm of the polyglycolic acid+38° C.). The temperature of the heat history is preferably a temperature higher by at least 40° C. than the melting point Tm. The upper limit of the temperature of the heat history is generally (the melting point Tm+100° C.). The temperature of the heat history is preferably a temperature range of from (the melting point Tm+38° C.) to (Tm+100° C.), more preferably a temperature range of from (Tm+40° C.) to (Tm+80° C.), particularly preferably a temperature range of from (Tm+45° C.) to (Tm+70° C.). The lower limit of the temperature of the heat history may be determined to be (Tm+55° C.).

When the polyglycolic acid is a homopolymer (Tm is about 222° C.), the temperature of the heat history is preferably 262 to 322° C., more preferably 265 to 310° C., particularly preferably 270 to 300° C.

If the temperature of the heat history is too low, it is difficult to make the temperature difference between the melting point Tm and the crystallization temperature $Tc_2$ sufficiently great. The temperature difference between the melting point Tm and the crystallization temperature $Tc_2$ is greater as the temperature of the heat history becomes higher. However, such a temperature difference shows a tendency to saturate before long. Therefore, there is no need to make the temperature of the heat history excessively high. The temperature of the heat history is desirably preset to at most 322° C. in view of occurrence of thermal decomposition and coloring, and the like. Similarly, if the temperature of the heat history is too low, it is difficult to make the temperature difference between the crystallization temperature $Tc_1$ and the glass transition temperature Tg sufficiently great.

When excessive heat history is applied at a high temperature exceeding the melting point Tm of the polyglycolic acid, the heat history is preferably applied in a short period of time because thermal decomposition and coloring are easy to be incurred. The time for which the heat history is applied is within a range of preferably from 1 to 100 minutes, more preferably from 2 to 30 minutes. If the time for which the heat history is applied is too short, the heat history becomes insufficient, and there is a possibility that thermal properties of the resulting polyglycolic acid, such as crystallinity, may not be sufficiently modified.

No particular limitation is imposed on the season to apply the heat history to the polyglycolic acid, and the heat history can be suitably performed at the time of polymerization, pelletization after the polymerization, forming or molding, or the like. The same polyglycolic acid may also be subjected to the heat history plural times.

Specific examples of a method for applying the heat history to the polyglycolic acid include (i) a method in which a polymer formed upon polymerization is heated to the temperature of heat history, (ii) a method in which the polyglycolic acid is melted and kneaded at the temperature of heat history, (iii) a method in which the polyglycolic acid is melt-extruded at the temperature of heat history to form pellets, (iv) a method in which the forming or molding temperature is controlled to the temperature of heat history, and (v) a method composed of a combination of these methods.

Among these, the method in which the polyglycolic acid is melted and kneaded at the temperature of heat history and the method in which the polyglycolic acid is melt-extruded at the temperature of heat history to form pellets are preferred. According to the method of pelletizing, the melting temperature of the polyglycolic acid is controlled, whereby polyglycolic acid controlled in crystallinity can be obtained without greatly changing the process. According to the method of melting and kneading the polyglycolic acid at the temperature of heat history, the polyglycolic acid can be pelletized at an ordinary melting temperature (in the case of a homopolymer, about 220 to 250° C.) after that.

As a process for applying the heat history to the polyglycolic acid while improving the melt stability, is desired a process comprising preparing polyglycolic acid through the steps of:

(1) subjecting glycolide to ring-opening polymerization in a molten state, (2) converting the polymer formed from the molten state to a solid state, and (3) subjecting the polymer in the solid state to solid phase polymerization if desired, and then applying heat history to the crystalline polyglycolic acid in the solid state through the step of:

(4) melting and kneading the polyglycolic acid at a temperature of not lower than (the melting point Tm of the polyglycolic acid+38° C.), preferably within a temperature range of from (Tm+38° C.) to (Tm+100° C.).

Figure 2:
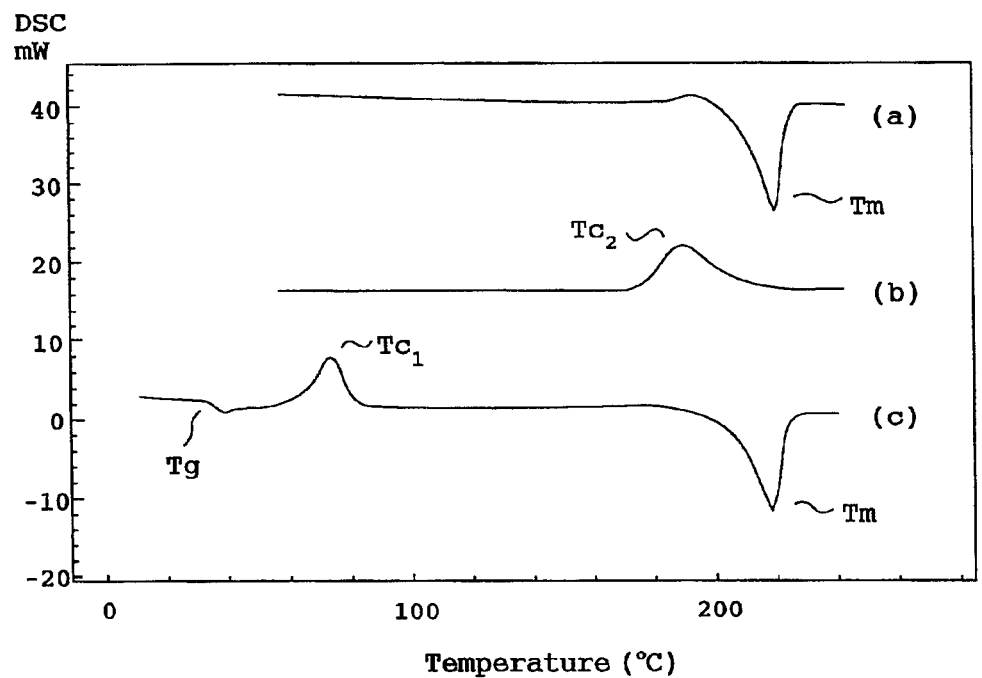
FIG. 2 illustrates calorimetric curves by DSC of a conventional polyglycolic acid.

According to the production process of the present invention, the thermal properties of the polyglycolic acid, such as crystallinity, can be modified. When a conventional polyglycolic acid homopolymer is taken as example, as illustrated in FIG. 2, the melting point Tm detected in the course of heating by DSC is about 220° C. [FIG. 2(a)], the crystallization temperature $Tc_2$ detected in the course of cooling is about 190° C. [FIG. 2(b)], the crystallization temperature $Tc_1$ detected in the course of heating is about 74° C. [FIG. 2(c)], and the glass transition temperature Tg detected in the course of heating is about 39° C. [FIG. 2(c)].

On the other hand, when heat history is applied to a polyglycolic acid homopolymer at a high temperature, polyglycolic acid, wherein as illustrated in FIG. 1, the melting point Tm is about 220° C. and substantially not varied [FIG. 1(a)], but the crystallization temperature $Tc_2$ is greatly lowered to, for example, 150° C. [FIG. 1(b)], the crystallization temperature $Tc_1$ is raised to, for example, 95° C. [FIG. 1(c)], and the glass transition temperature Tg is about 39° C. and substantially not varied [FIG. 1(c)], can be obtained.

Figure 3:
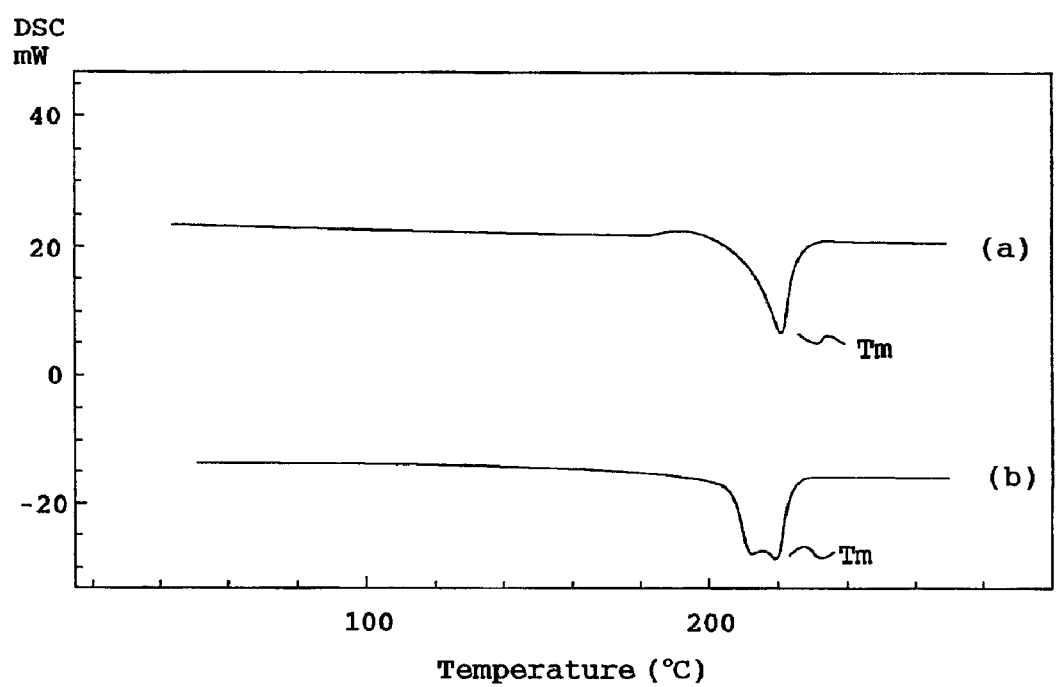
FIG. 3 illustrates the fact that polyglycolic acid, to which heat history has been applied at a high temperature, has a single endothermic peak (a), while polyglycolic acid, to which heat history has been applied at a relatively low temperature, has an endothermic peak (b) divided into two portions.

When heat history is applied to the polyglycolic acid homopolymer at a relatively low temperature of about 250 to 260° C. to measure the melting point Tm again, an endothermic peak attributable to melting is divided into two portions as illustrated in FIG. 3(b), or a shoulder appears. On the other hand, when heat history is applied to the polyglycolic acid homopolymer at a high temperature of about 270 to 300° C. to measure the melting point Tm again, an endothermic peak due to melting becomes single as illustrated in FIG. 3(a). Accordingly, the fact that sufficient heat history has been applied to the crystalline polyglycolic acid can also be confirmed by determining the form of an endothermic peak at the melting point Tm thereof.

4. Controlling Process of Crystallinity of Polyglycolic Acid:

When heat history is applied to crystalline polyglycolic acid for 1 to 100 minutes within a temperature range higher than the melting point Tm thereof, but not higher than (Tm+100° C.), the crystallinity of the polyglycolic acid can be controlled.

When heat history upon polymerization is a temperature lower than (the melting point Tm+38° C.), and heat history is applied to the polymer at a temperature of not lower than (Tm+38° C.) when melting it after the polymerization to form pellets, the crystallization temperature of the polymer can be controlled by controlling the temperature of the heat history. Accordingly, polyglycolic acids having respective crystallization temperatures suitable for various molding or forming methods such as injection molding and extrusion can be separately produced by a polymerization process.

As a preferable process for controlling the crystallinity of the polyglycolic acid, may be mentioned a process comprising preparing polyglycolic acid through the steps of:

(1) subjecting glycolide to ring-opening polymerization in a molten state, (2) converting the polymer formed from the molten state to a solid state, and (3) subjecting the polymer in the solid state to solid phase polymerization if desired, and then applying heat history to the crystalline polyglycolic acid in the solid state through the step of:

(4) melting and kneading the polyglycolic acid under heating.

Polyglycolic acid controlled in crystallinity can be obtained by controlling the heating temperature in the step (4). The heating is generally conducted within a temperature range higher than the melting point Tm, but not higher than (Tm+100° C.) though the temperature varies according to the melting point of the polyglycolic acid. In the case of the polyglycolic acid homopolymer, the heating is conducted within a temperature range higher than 220° C., but not higher than 320° C.

The relationship between the heating temperature and the crystallinity can be simply confirmed by measuring the crystallization temperature $Tc_2$ by DSC. The determining method of the heating temperature by means of DSC may be a useful means for development and process control because it can be determined by an extremely small amount of a sample and a short period of time.

5. Melt-Stable Polyglycolic Acid Composition:

In the present invention, a polyglycolic acid composition excellent in melt stability can be provided by adding a heat stabilizer to crystalline polyglycolic acid. More specifically, according to the present invention, there is provided a polyglycolic acid composition comprising crystalline polyglycolic acid and a heat stabilizer, wherein a difference $(T_2-T_1)$ between the temperature $T_2$ at 3%-weight loss on heating of the polyglycolic acid composition and the temperature $T_1$ at 3%-weight loss on heating of the crystalline polyglycolic acid is not lower than 5° C.

Besides, heat history is applied to a polyglycolic acid composition comprising crystalline polyglycolic acid and a heat stabilizer at a temperature of not lower than (the melting point Tm of the crystalline polyglycolic acid+38° C.), whereby a polyglycolic acid composition which comprises crystalline polyglycolic acid, wherein (i) a difference $(Tm-Tc_2)$ between the melting point Tm defined as a maximum point of an endothermic peak attributable to melting of a crystal detected in the course of heating at a heating rate of 10° C./min by means of DSC and the crystallization temperature $Tc_2$ defined as a maximum point of an exothermic peak attributable to crystallization detected in the course of cooling from a molten state at a cooling rate of 10° C./min is not lower than 35° C., and wherein (ii) a difference $(T_2-T_1)$ between the temperature $T_2$ at 3%-weight loss on heating of the polyglycolic acid composition and the temperature $T_1$ at 3%-weight loss on heating of the polyglycolic acid is not lower than 5° C., can be produced.

Further, by the above-described heat history, can be provided crystalline polyglycolic acid which is excellent in melt stability, and wherein a difference $(Tc_1-Tg)$ between the crystallization temperature $Tc_1$ defined as a maximum point of an exothermic peak attributable to crystallization detected in the course of heating an amorphous sheet at a heating rate of 10° C./min by means of DSC and the glass transition temperature Tg defined as a temperature at a second-order transition point on a calorimetric curve detected in said course is not lower than 40° C.

Such a polyglycolic acid having excellent melt stability and improved in crystallinity can be suitably obtained by a process comprising preparing polyglycolic acid through the steps of:

(1) subjecting glycolide to ring-opening polymerization in a molten state, (2) converting the polymer formed from the molten state to a solid state, and (3) subjecting the polymer in the solid state to solid phase polymerization if desired, and then applying heat history to the crystalline polyglycolic acid in the solid state through the step of:

(4) mixing the crystalline polyglycolic acid in the solid state with a heat stabilizer and melting and kneading the resultant mixture at a temperature of not lower than (the melting point Tm of the crystalline polyglycolic acid+38° C.), preferably within a temperature range of from (Tm+38° C.) to (Tm+100° C.).

Polyglycolic acid is insufficient in melt stability and tends to generate gasses upon its melt processing. In the conventional polyglycolic acid, a temperature at which the weight loss upon heating reaches 3% is about 300° C. In addition, many of additives such as a catalyst deactivator, a nucleating agent, a plasticizer and an antioxidant deteriorate the melt stability of polyglycolic acid.

In order to improve the melt stability of the polyglycolic acid, accordingly, it is necessary to select a heat stabilizer in such a manner that when the heat stabilizer is added to the polyglycolic acid to prepare a composition, a difference $(T_2-T_1)$ between the temperature $T_2$ at 3%-weight loss on heating of the polyglycolic acid composition and the temperature $T_1$ at 3%-weight loss on heating of the polyglycolic acid is not lower than 5° C. Such a heat stabilizer can be selected from among compounds conventionally known as antioxidants for polymers, and may also be selected from among heavy metal deactivators, catalyst deactivators, nucleating agents, etc. which have not been used as heat stabilizers for polymers.

As heat stabilizers, are preferred heavy metal deactivators, phosphates having a pentaerythritol skeleton structure, phosphorus compounds having at least one hydroxyl group and at least one long-chain alkyl ester group, metal carbonates, etc. These compounds may be used either singly or in any combination thereof. It has been found that many of phosphorus compounds such as phosphate antioxidants rather exhibit an effect to inhibit the melt stability of polyglycolic acid. On the other hand, the phosphates having a pentaerythritol skeleton structure represented by the following formula (III):

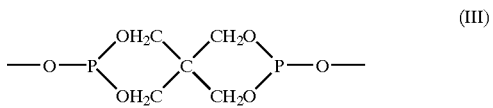

(III)

exhibit an effect to specifically improve the melt stability of the polyglycolic acid.

Specific examples of such phosphates having the pentaerythritol skeleton structure include cyclic neopentanetetraylbis(2,6-di-tert-butyl-4-methyl-phenyl)phosphite represented by the formula (1):

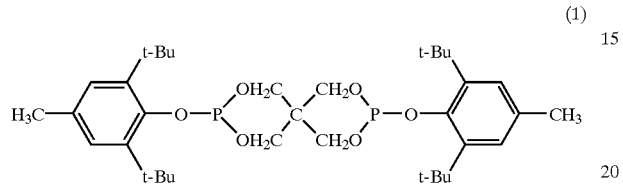

(1)

cyclic neopentanetetraylbis(2,6-di-tert-butylphenyl) phosphite represented by the formula (2):

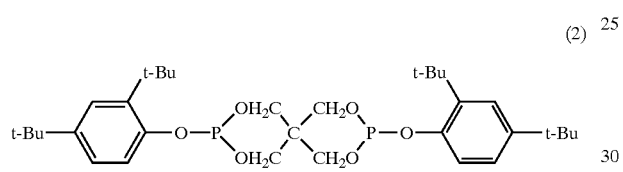

(2)

a phosphate antioxidant represented by the formula (3):

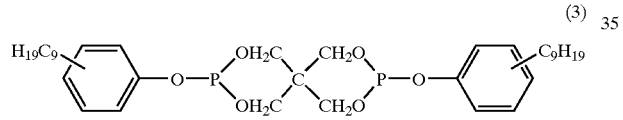

(3)

and a phosphate antioxidant represented by the formula (4):

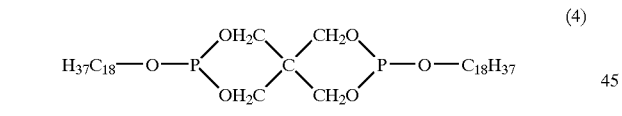

(4)

Among these, cyclic neopentanetetraylbis(2,6-di-tert-butyl-4-methylphenyl)phosphite represented by the formula (1) is particularly preferably because it has an effect to markedly enhance the temperature at 3%-weight loss on heating of the polyglycolic acid even by the addition in a small amount.

Among the phosphorus compounds, are preferred phosphorus compounds having at least one hydroxyl group and at least one long-chain alkyl ester group represented by the formula (IV):

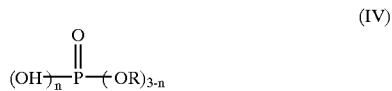

(IV)

The number of carbon atoms in the long-chain alkyl is preferably within a range of 8 to 24. Specific examples of such phosphorus compounds include mono- or di-stearyl acid phosphate represented by the formula (5):

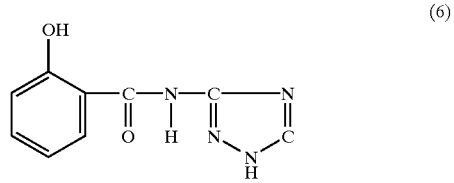

(5)

n = 1 or 2

Example of the heavy metal deactivators include 2-hydroxy-N-1H-1,2,4-triazol-3-yl-benzamide represented by the formula (6):

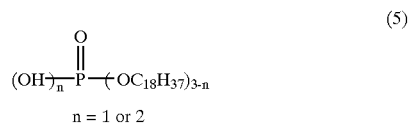

(6)

and bis[2-(2-hydroxybenzoyl)hydrazin]dodecanediacid represented by the formula (7):

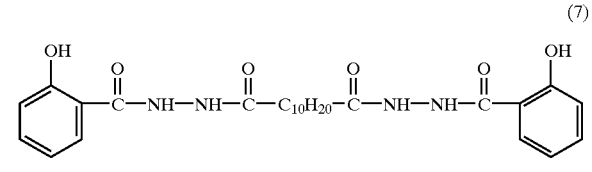

(7)

Examples of the metal carbonates include calcium carbonate and strontium carbonate.

A proportion of these heat stabilizer incorporated is generally 0.001 to 5 parts by weight, preferably 0.003 to 3 parts by weight, more preferably 0.005 to 1 part by weight per 100 parts by weight of the crystalline polyglycolic acid. The heat stabilizer is preferably that having an effect to improve the melt stability even by the addition in an extremely small amount. If the amount of the heat stabilizer incorporated is too great, the effect is saturated, or there is a possibility that the transparency of the resulting polyglycolic acid composition may be impaired.

6. Molding or Forming and Processing and uses:

Since the crystalline polyglycolic acid and polyglycolic acid compositions according to the present invention are markedly improved in the heat stability upon their melt processing and also widened in the temperature range upon the melt processing, they are easily formed or molded into various kinds of formed or molded products such as films, sheets, fibers, other extruded products, injection-molded products and blow molded products. Films are preferably stretched films and heat-shrinkable films. The sheets can be processed into containers such as trays and cups by a sheet forming method such as vacuum forming or pressure forming. The blow molded products include blow molded containers and stretch blow molded containers.

Since the polyglycolic acid compositions according to the present invention are far excellent in melt stability, the compositions will hereinafter be mainly described. However, the crystalline polyglycolic acid according to the present invention is also formed or molded and processed like the compositions and applied to like uses.

A film is generally produced by melt-extruding pellets formed of a polyglycolic acid composition through a flat die such as a T-die or a circular die.

A stretched film is produced by forming a sheet by melt-extruding pellets formed of the composition, stretching the sheet while cooling it or optionally reheating and stretching the sheet after cooled, and then optionally heat-setting it. As a film forming process, is mentioned a process in which a sheet is melt-extruded by means of a flat die, and the sheet is then subjected to uniaxial stretching, successively biaxial stretching or simultaneously biaxial stretching by a roll method, a tenter or a combination thereof. A process of biaxially stretching the sheet by tubular film extrusion using a circular die may also be adopted.

The stretched film may be a single layer or be laminated on other resin layers, paper and/or the like as needed. Laminating processes include lamination, coating and co-extrusion. Dry processes such as deposition of aluminum may also be applied.

The lamination includes wet lamination, dry lamination, extrusion lamination, hot melt lamination and nonsolvent lamination. The coating includes a process of applying a moistureproof coating or moistureproof laminate to the surface of the stretched film.

In the lamination by the co-extrusion, it is preferable to arrange a layer of the composition according to the present invention as an intermediate layer and other resin layers as inner and outer layers. Examples of the layer structure include at least a 3-layer structure of outer layer/intermediate layer/inner layer. An adhesive layer may also be arranged between the respective adjacent layers as needed. When stretching is conducted after co-extrusion, the whole of the resultant laminate is stretched, and so thermoplastic resins capable of being stretched with ease are selected as resins for forming the outer and inner layers. As the outer or inner layer, a layer formed of, for example, a resin capable of being sealed or a resin excellent in impact resistance, abuse resistance, heat resistance (for example, resistance to boiling, resistance to retorting) or the like may be arranged according to the desired function. The outer, intermediate and inner layers may be separately arranged as a multi-layer.

Examples of the laminate by the lamination include those respectively having the following layer structures:
1) outer layer/intermediate layer/inner layer;
2) outer layer/intermediate layer/moistureproof layer;
3) outer layer/intermediate layer/moistureproof layer/inner layer;
4) moistureproof layer/outer layer/intermediate layer/inner layer;
5) moistureproof layer/outer layer/intermediate layer/moistureproof layer/; and
6) moistureproof layer/outer layer/intermediate layer/moistureproof layer/inner layer.

The outer, intermediate and inner layers may be separately formed as a single layer or a multi-layer. An adhesive layer is arranged between the respective adjacent layers as needed. In these laminated films, it is preferable that stretched film(s) be contained as a part or the whole of the films, and at leas one of the stretched film be a stretched film formed of the composition according to the present invention. It is more preferable from the viewpoint of gas barrier properties that the intermediate layer be a stretched film formed of the composition according to the present invention. A deposition layer of a metal or metal oxide, such as aluminum deposition layer may be additionally arranged to the outermost layer or intermediate layer.

A film formed of the polyglycolic acid composition according to the present invention is preferably a stretched film, not an unstretched film from the viewpoint of film strength, optical properties or the like.

The heat-shrinkable film can be produced by subjecting the stretched film to no heat setting or controlling heat setting conditions. The heat-shrinkable film is suitably used as a packaging film and may also be used as a string material such as split yarn.

The films are used as packaging films for food, sundries, sanitary goods, medical instruments, industrial parts, electronic parts, precision instruments, etc. or agricultural films. The packaging films may be formed into bags such as sucks or pouches. A flat film or a film opened from a wide tubular blown film may be formed into a bag after forming a tube by center seaming. The film may also be applied to an automatic packaging machine by which contents can be packed while forming it into a bag.

The sheet is produced by melt-extruding pellets formed of the polyglycolic acid composition into a sheet through a flat die or circular die. The sheet may be a single layer or be laminated for use on other resin layers, paper and/or the like as needed. The sheet may be applied to various packaging materials relatively thicker than the film. The sheet may be formed and processed into containers such as trays relatively shallow in draw ratio or cups relatively deep in draw ratio by a sheet forming method such as vacuum forming.

As examples of the layer structure of the laminated sheet, may be mentioned the same layer structures as in the laminated film. When a laminate is produced by lamination, each layer may be formed as a sheet, but at least one of an outer layer, an inner layer, an intermediate layer, etc. may be formed as a stretched film. It is preferable from the viewpoint of gas barrier properties that the intermediate layer be a layer formed of the polyglycolic acid composition according to the present invention. An adhesive layer may also be arranged between the respective adjacent layers as needed. An deposition layer may also be added.

The injection-molded product can be produced by feeding pellets formed of the polyglycolic acid composition to an injection molding machine equipped with a mold for injection molding and then injection-molding them. When the injection-molded product is used in an application field making good use of the biodegradability of the polyglycolic acid, it is molded from the polyglycolic acid alone. However, it may be coated with another resin layer as needed. The injection-molded product is used as, for example, sundries (for examples, tableware, boxes•cases, hollow bottles, kitchenware and flower pots), writing utensils, appliances (various kinds of cabinets), range containers, cup containers, etc.

As the fibers, strings formed of a biodegradable resin comprising the polyglycolic acid, for example, fishing lines may be produced. Since a thermoplastic resin composed of the polyglycolic acid is relatively hard, it is preferable to provide a composite string comprising this resin as a core and another thermoplastic resin, for example, a relatively soft biodegradable resin, as a sheath.

The hollow molded products include hollow containers (for example, bottles) having gas barrier properties. As the hollow molded product, a stretch blow molded container is preferred. As a process for producing the stretch blow molded container, may be adopted a process disclosed in Japanese Patent Application Laid-Open No. 10-337771, or the like.

The hollow molded products include single-layer containers formed of the polyglycolic acid composition. However, they may be provided as multi-layer containers with other resin layers. In the case of a multi-layer container, a layer of the polyglycolic acid composition excellent in gas barrier properties is generally arranged as an intermediate layer. Accordingly, examples of the layer structure of the multi-layer container include at least a 3-layer structure of outer layer/intermediate layer/inner layer. An adhesive layer may be arranged between the respective adjacent layers as needed.

Examples of uses of the hollow molded products include containers for drinks such as carbonated beverage, cooling drinks, juices and mineral water; container for food; containers for seasonings such as soy, sauce, ketchup, mayonnaise, edible oil and mixtures thereof; containers for alcoholic drinks such as beer, sake, whiskey and wine; containers for detergents; containers for cosmetics; containers for agricultural chemicals; containers for gasoline; containers for alcohols; etc.

A container obtained by using a layer of the polyglycolic acid composition as an intermediate layer and arranging layers of a high density polyethylene resin on both sides thereof through an adhesive layer as needed may also be used as a gasoline tank. A container obtained by arranging layers of a polypropylene resin such as a homopolypropylene resin or copolypropylene resin on both sides of the polyglycolic acid composition layer may also be provided for uses of which heat resistance, transparency and the like are required. Since a container having at least a 3-layer structure composed of polyester resin/polyglycolic acid composition/polyester resin or a layer structure that other thermoplastic resin layers and adhesive layers are suitably arranged in addition to these layers is excellent in gas barrier properties and transparency, it is suitable for use as a bottle for beer or the like. An intermediate layer composed of a blend of a polyester resin and the polyglycolic acid composition may also be additionally formed. As described above, a blend of the polyglycolic acid composition with another thermoplastic resin co-extruded or co-injected therewith may be preferably used as an intermediate layer, surface layer or adhesive layer, so far as it does not incur particular disadvantage for properties of the intended use. The use of this blend is useful from the viewpoint of environment such as recycling.

The polyglycolic acid compositions according to the present invention can be molded into foamed products. In a laminate or multi-layer structure, a layer of the polyglycolic acid composition may be arranged as a foamed layer.

In such various formed or molded products as described above, a desiccating agent, water-absorbing agent or the like may also be incorporated into a resin forming each layer. In the laminate or multi-layer structure, a deoxidizer-containing layer may be arranged. In the adhesive layer optionally used in the laminate or multi-layer structure, are used the adhesives described in Japanese Patent Application Laid-Open No. 10-138371, such as epoxidated polyolefins, or the like.

ADVANTAGES OF THE INVENTION

According to the present invention, there are provided polyglycolic acid modified in thermal properties such as crystallinity, and a production process thereof. The polyglycolic acid modified in crystallinity according to the present invention is excellent in melt processability, stretch processability, etc., and is suitable for use as a polymer material for sheets, films, fibers, blow molded products, composite materials (multi-layer films, multi-layer containers, etc.), other molded or formed products, etc. According to the present invention, there are also provided polyglycolic acid compositions which are so excellent in melt stability that generation of gasses upon their melting is prevented, and a production process thereof. According to the present invention, there are further provided polyglycolic acid compositions modified in thermal properties such as crystallinity and improved in melt stability. According to the present invention, there is still further provided a process for controlling the crystallinity of polyglycolic acid.

EMBODIMENTS OF THE INVENTION

The present invention will hereinafter be described more specifically by the following Examples and Comparative Examples. Physical properties and the like in the examples were measured in accordance with the following respective methods:

(1) DSC Measurement:

The thermal properties of each sample were measured by means of a differential scanning calorimeter TC10A manufactured by METTLER INSTRUMENT AG. Dry nitrogen was caused to flow at a rate of 50 ml/min during the measurement to conduct the measurement under a nitrogen atmosphere. The sample was used in an amount of about 10 mg and placed in an aluminum pan to conduct the measurement.

The melting point Tm was measured by heating the sample from 50° C. at a heating rate of 10° C./min. The crystallization temperature $Tc_2$ was measured by heating the sample at a heating rate of 10° C./min from 50° C. to a temperature higher by 30° C. than the melting point, at which a peak attributable to the melting of a crystal disappears, holding the sample for 2 minutes at that temperature and then cooling it at a cooling rate of 10° C./min. When the melting point Tm and the crystallization temperature $Tc_2$ were measured by heating a sample from −50° C., however, an express mention was made to that effect.

The crystallization temperature $Tc_1$ was measured by providing an amorphous film in a transparent solid state by preheating a sample at 240° C. for 30 seconds, pressing it for 15 seconds under a pressure of 5 MPa to prepare a film (sheet) and immediately pouring this film into ice water to cool it, and heating this amorphous film as a sample from −50° C. at a heating rate of 10° C./min. At this time, the glass transition temperature Tg was also measured. The melt enthalpy was determined from the crystallization temperature $Tc_2$ and the area of the crystallization peak.

(2) Measurement of Temperature at Weight Loss on Heating:

A thermogravimetric analyzer TC11 manufactured by METTLER INSTRUMENT AG was used to place a sample (20 mg) vacuum-dried at 30° C. for at least 6 hours in a platinum pan, the sample was heated from 50° C. to 400° C. at a heating rate of 10° C./min under a dry nitrogen atmosphere at 10 ml/min, thereby measuring weight loss during that. A temperature at which the weight was reduced by 3% of the weight at the time the measurement had been started was regarded as a temperature at 3%-weight loss on heating.

EXAMPLE 1

An aluminum pan was charged with 10 mg of polyglycolic acid (melting point Tm=222° C., melt enthalpy of crystal=71 J/g) synthesized by ring-opening polymerization of glycolide, and the polyglycolic acid was heated from 50° C. to a predetermined temperature at a heating rate of 10° C./min under a dry nitrogen atmosphere at 50 ml/min (first heating). After the polyglycolic acid was held for 2 minutes at the predetermined temperature, it was cooled to 50° C. at a cooling rate of 10° C./min (first cooling). The melting point Tm was found from an endothermic peak attributable to the melting of the crystal upon the first heating, and the crystallization temperature $Tc_2$ was found from an exothermic peak attributable to crystallization upon the first cooling. The measuring results including the crystallization temperatures $Tc_2$ and the crystallization enthalpies (J/g) found from the area of the crystallization peak when the predetermined temperature was changed to 240, 250, 260, 270, 280, 290 and 300° C. are shown in Table 1.

TABLE 1

| Run No. | 1-1 | 1-2 | 1-3 | 1-4 | 1-5 | 1-6 | 1-7 |
|---|---|---|---|---|---|---|---|
| Heat history, predetermined temperature (° C.) | 240 | 250 | 260 | 270 | 280 | 290 | 300 |
| Melting point Tm (° C.) | 222 | 222 | 222 | 222 | 222 | 222 | 222 |
| Crystallization temperature $Tc_2$ (° C.) | 193 | 191 | 185 | 162 | 139 | 142 | 141 |
| Melt enthalpy (J/g) | 67 | 69 | 74 | 63 | 59 | 56 | 62 |
| $Tm - Tc_2$ | 29 | 31 | 37 | 60 | 83 | 80 | 81 |

From the results shown in Table 1, it is understood that the crystallization temperature $Tc_2$ can be controlled by applying heat history to polyglycolic acid. It is also understood that a temperature difference between the melting point Tm and the crystallization temperature $Tc_2$ can be made great by applying heat history to polyglycolic acid at a temperature of not lower than 260° C., preferably 270 to 300° C.

EXAMPLE 2

The same polyglycolic acid as that used in Example 1 was melted at 270° C., formed into a sheet by a water-cooled press and cooled. As a result, a transparent sheet was obtained. This sheet was able to be stretched.

COMPARATIVE EXAMPLE 1

The polyglycolic acid was melted in the same manner as in Example 2 except that the melting temperature was changed to 250° C., formed into a sheet by a water-cooled press and cooled. The sheet thus obtained was opaque due to its crystallization and unable to be stretched. When the water-cooled press was changed to an ice water-cooled press, a transparent sheet was obtained with difficulty. However, it was difficult to be stretched.

EXAMPLE 3

An aluminum pan was charged with 10 mg of polyglycolic acid (melting point Tm=222° C., melt enthalpy of crystal=71 J/g) synthesized by ring-opening polymerization of glicolide, and the polyglycolic acid was heated from −50° C. to a predetermined temperature A at a heating rate of 10° C./min under a dry nitrogen atmosphere at 50 ml/min (first heating). After the polyglycolic acid was held for 2 minutes at the predetermined temperature, it was cooled to −50° C. at a cooling rate of 10° C./min (first cooling). The polyglycolic acid was heated again from −50° C. to a predetermined temperature at a heating rate of 10° C./min (second heating). After the polyglycolic acid was held for 2 minutes at the predetermined temperature B, it was cooled to −50° C. at a cooling rate of 10° C./min (second cooling). The predetermined temperatures A and B in the first heating and second heating were changed to 250° C. and 250° C., 250° C. and 280° C., and 280° C. and 250° C., respectively, to conduct experiments.

The melting points Tm and the crystallization temperatures $Tc_2$ in the first heating and first cooling, and the second heating and second cooling in each experiment are shown in Table 2.

TABLE 2

| Run No. | Predetermined temp. A in first heat history (° C.) | Predetermined temp. B in second heat history (° C.) | Melting point Tm on heating in first heat history (° C.) | Crystallization temp. $Tc_2$ cooling in first heat history (° C.) | Melting point Tm on heating in second heat history (° C.) | Crystallization temp. $Tc_2$ cooling in second heat history (° C.) |
|---|---|---|---|---|---|---|
| 3-1 | 250 | 250 | 222 | 190 | 221 | 189 |
| 3-2 | 250 | 280 | 222 | 188 | 220 | 148 |
| 3-3 | 280 | 250 | 222 | 148 | 221 | 149 |

When the predetermined temperatures A and B in the first heating and second heating were 250° C. and 250° C. (Run No. 3-1), respectively, a temperature difference between the melting point Tm and the crystallization temperature $Tc_2$ was as small as less than 35° C. When the predetermined temperatures A and B in the first heating and second heating were 250° C. and 280° C. (Run No. 3-2), and 280° C. and 250° C. (Run No. 3-3), respectively), however, a temperature difference between the melting point Tm and the crystallization temperature $Tc_2$ became large as not lower than 70° C.

EXAMPLE 4

A glass-made test tube was charged with 100 g of glicolide and 4 mg of tin dichloride dehydrate, and the contents were stirred at 200° C. for 1 hour and then left at rest for 3 hours to conduct ring-opening polymerization. After completion of the polymerization, the reaction mixture was cooled, and a polymer formed was then taken out, ground and washed with acetone. The polymer was then vacuum-dried at 30° C. to collect the polymer. This polymer was put into a Laboplast Mill equipped with a roller mixer manufactured by Toyo Seiki Seisakusho, Ltd., which was preset to 280° C., and melted and kneaded for 10 minutes. An aluminum pan was charged with 10 mg of the resultant polyglycolic acid (melting point Tm=222° C., melt enthalpy of crystal=71 J/g), and the polyglycolic acid was heated from −50° C. to 250° C. at a heating rate of 10° C./min under a dry nitrogen atmosphere at 50 ml/min (first heating). After the polyglycolic acid was held for 2 minutes at the predetermined temperature, it was cooled to −50° C. at a cooling rate of 10° C./min (first cooling). The melting point Tm and the crystallization temperature $Tc_2$ in the first heating and first cooling were 220° C. and 150° C., respectively, and a temperature difference between them was 70° C.

COMPARATIVE EXAMPLE 2

Heat history was applied to the polyglycolic acid in the same manner as in Example 4 except that the melting and kneading temperature in Example 4 was changed from 280° C. to 240° C. As a result, the melting point Tm and the crystallization temperature $Tc_2$ in the first heating and first cooling were 223° C. and 190° C., respectively, and a temperature difference between them was 33° C.

EXAMPLE 5

A glass-made test tube was charged with 100 g of glycolide and 4 mg of tin dichloride dehydrate, and the contents were stirred at 200° C. for 1 hour and then left at rest for 3 hours to conduct ring-opening polymerization. After completion of the polymerization, the reaction mixture was cooled, and a polymer formed was then taken out, ground and washed with acetone. The polymer was then vacuum-dried at 30° C. to collect the polymer. This polymer was put into a Laboplast Mill equipped with a roller mixer manufactured by Toyo Seiki Seisakusho, Ltd., which was preset to 280° C., and melted and kneaded for 10 minutes. The resultant polyglycolic acid (melting point Tm=222° C., melt enthalpy of crystal=71 J/g) was preheated at 240° C. for 30 seconds and then pressed for 15 seconds under a pressure of 5 MPa to prepare a film, and this film was immediately poured into ice water to cool it, thereby obtaining a film in a transparent solid state. This film was heated from –50° C. at a heating rate of 10° C./min under a nitrogen atmosphere by DSC to measure its crystallization temperature $Tc_1$. As a result, it was 95° C. The glass transition temperature Tg of the polyglycolic acid was 39° C. The results are shown in Table 3.

COMPARATIVE EXAMPLE 3

Heat history was applied to the polyglycolic acid in the same manner as in Example 5 except that the melting and kneading temperature in Example 5 was changed from 280° C. to 240° C., and a film was prepared. This film was heated from –50° C. at a heating rate of 10° C./min under a nitrogen atmosphere by DSC to measure its crystallization temperature $Tc_1$. As a result, it was 74° C. The glass transition temperature Tg of the polyglycolic acid was 39° C. The results are shown in Table 3.

TABLE 3

|  | Example 5 | Comparative Example 3 |
|---|---|---|
| Crystallization temperature $Tc_1$ (° C.) | 95 | 74 |
| Glass transition temperature Tg (° C.) | 39 | 39 |
| $Tc_1$ – Tg | 56 | 35 |

As apparent from the results shown in Table 3, heat history is applied to polyglycolic acid at a temperature higher by not lower than 38° C., preferably not lower than 40° C. than the melting point Tm thereof (Example 5), whereby a temperature difference between the crystallization temperature $Tc_1$ and the glass transition temperature Tg can be made greater than not lower than 40° C.

EXAMPLE 6

Various kinds of compounds shown in Table 4 were separately added in a proportion of 0.5 parts by weight to polyglycolic acid (melting point Tm=222° C.) synthesized by ring-opening polymerization of glicolide to blend them with each other by hand. Each of the resultant blends was put into a Laboplast Mill equipped with a roller mixer manufactured by Toyo Seiki Seisakusho, Ltd., which was preset to 240° C., and melted and kneaded for 10 minutes. The temperatures at 3%-weight loss on heating of the respective resultant polyglycolic acid compositions were measured. The results are shown in Table 4.

TABLE 4

| Run No. | Additive | Temperature at 3%-weight loss on heating (° C.) | Difference with natural polymer (° C.) |
|---|---|---|---|
| 6-1 | Not added | 304.7 | — |
| 6-2 | Hakuenka | 312.7 | 8.0 |
| 6-3 | $SrCO_3$ | 310.0 | 5.3 |
| 6-4 | CDA-1 | 322.0 | 17.3 |
| 6-5 | CDA-6 | 327.3 | 22.6 |
| 6-6 | PEP-36 | 340.5 | 35.8 |
| 6-7 | AX-71 | 317.2 | 12.5 |
| 6-8 | NA-21 | 292.7 | –12.0 |
| 6-9 | NA-30 | 288.7 | –16.0 |
| 6-10 | MgO | 276.7 | –28.0 |
| 6-11 | Mizukaraiza DS | 304.7 | 0.0 |
| 6-12 | Ca stearate | 292.7 | –12.0 |
| 6-13 | NA-10 | 284.5 | –20.2 |
| 6-14 | NA-11 | 290.3 | –14.4 |
| 6-15 | Pinecrystal KM-1500 | 253.0 | –51.7 |
| 6-16 | $Al_2O_3$ | 276.3 | –28.4 |
| 6-17 | $SiO_2$ | 299.7 | –5.0 |
| 6-18 | HP-10 | 300.8 | –3.9 |
| 6-19 | 2112 | 270.5 | –34.2 |
| 6-20 | PN-400 | 283.3 | –21.4 |
| 6-21 | PEP-8 | 335.8 | 31.1 |

(Note)
(1) Hakuenka: Calcium carbonate, product of Shiraishi Kogyo Kaisha, Ltd.,
(2) $SrCO_3$: Product of Kanto Chemical Co., Inc.,
(3) CDA-1: 2-Hydroxy-N-1H-1,2,4-triazol-3-yl-benzamide [compound of the formula (6), trade name: Adekastab CDA-1; product of Asahi Denka Kogyo K.K.],
(4) CDA-6: Bis [2-(2-hydroxybenzoyl)hydrazin]dodecanediacid [compound of the formula (7), trade name: Adekastab CDA-6; product of Asahi Denka Kogyo K.K.],
(5) PEP-36: Cyclic neopentanetetraylbis(2,6-di-tert-butyl-4-methylphenyl) phosphite [compound of the formula (1), trade name: Adekastab PEP-36; product of Asahi Denka Kogyo K.K.],
(6) AX-71: Mono- or di-stearyl acid phosphate [compound of the formula (5), trade name: Adekastab AX-71; product of Asahi Denka Kogyo K.K.],
(7) NA-21: Nucleating agent, bis (2,4,8,10-tetra-tert-butyl-6-hydroxy-12H-dibenzo-[d,g][1,3,2]dioxaphosphosin-6-oxide aluminum hydroxide salt (trade name: Adekastab NA-21; product of Asahi Denka Kogyo K.K.),
(8) NA-30: Nucleating agent (complex compound; trade name: Adekastab NA-30; product of Asahi Denka Kogyo K.K.),
(9) MgO: Product of Kanto Chemical Co., Inc.,
(10) Mizukaraiza DS: Na-A type synthetic zeolite; product of Mizusawa Industrial Chemicals, Ltd.,
(11) Ca stearate: Product of Kanto Chemical Co., Inc.,
(12) NA-10: Nucleating agent, sodium bis(4-tert-butylphenyl) phosphate (trade name: Adekastab NA-10; product of Asahi Denka Kogyo K.K.),
(13) NA-11: Nucleating agent, sodium 2,2'-methylenebis(4,6-di-tert-butylphenyl) phosphate (trade name: Adekastab NA-11; product of Asahi Denka Kogyo K.K.),
(14) Pinecrystal KM-1500: Rosin nucleating agent; product of Arakawa Chemical Industries, Ltd.,
(15) $Al_2O_3$: Product of Kanto Chemical Co., Inc.,
(16) $SiO_2$: Product of Kanto Chemical Co., Inc.,
(17) HP-10: Phosphite antioxidant, 2,2-methylenebis(4,6-di-tert-butylphenyl) octylphosphite (trade name: Adekastab HP-10; product of Asahi Denka Kogyo K.K.),
(18) 2112: Phosphite antioxidant, tris(2,4-di-tert-butylphenyl)phosphite (trade name: Adekastab 2112; product of Asahi Denka Kogyo K.K.),
(19) PN-400: Plasticizer, adipic acid-based polyester (trade name: Adekacizer PN-400; product of Asahi Denka Kogyo K.K.),
(20) PEP-8: cyclic neopentanetetraylbis(octadecyl) phosphite [compound of the formula (4), trade name: Adekastab PEP-8; product of Asahi Denka Kogyo K.K.].

EXAMPLE 7

Mono- or di-stearyl acid phosphate [compound of the formula (5), trade name: Adekastab AX-71; product of Asahi Denka Kogyo K.K.] was added in a proportion of 0.1 parts by weight to polyglycolic acid (melting point Tm=222° C.) synthesized by ring-opening polymerization of glycolide to blend them with each other by hand. The resultant blend was put into a Laboplast Mill equipped with a roller mixer manufactured by Toyo Seiki Seisakusho, Ltd., which was preset to 270° C., and melted and kneaded for 10 minutes. The temperature at 3%-weight loss on heating, melting point Tm and crystallization temperature $Tc_2$ of the resultant polyglycolic acid composition were measured. The results are shown in Table 5.

TABLE 5

| Run No. | 7-1 | 7-2 |
|---|---|---|
| Additive | Not added | AX-71 |
| Temperature at 3%-weight loss on heating (° C.) | 294 | 336 |
| Melting point Tm (° C.) | 222 | 219 |
| Crystallization temperature $Tc_2$ (° C.) | 155 | 170 |
| Tm – $Tc_2$ | 67 | 49 |

What is claimed is:

1. Crystalline polyglycolic acid, wherein
   (a) a difference (Tm–$Tc_2$) between the melting point Tm defined as a maximum point of an endothermic peak attributable to melting of a crystal detected in the course of heating at a heating rate of 10° C./min by means of a differential scanning calorimeter and the crystallization temperature $Tc_2$ defined as a maximum point of an exothermic peak attributable to crystallization detected in the course of cooling from a molten state at a cooling rate of 10° C./min is not lower than 35° C., and
   (b) a difference ($Tc_1$–Tg) between the crystallization temperature $Tc_1$ defined as a maximum point of an exothermic peak attributable to crystallization detected in the course of heating an amorphous sheet at a heating rate of 10° C./min by means of a differential scanning calorimeter and the glass transition temperature Tg defined as a temperature at a second-order transition point on a calorimetric curve detected in said course is not lower than 40° C.

2. The crystalline polyglycolic acid according to claim 1, wherein the difference (Tm–$Tc_2$) between the melting point Tm and the crystallization temperature $Tc_2$ is not lower than 40° C., and the difference ($Tc_1$–Tg) between the crystallization temperature $Tc_1$ and the glass transition temperature Tg is not lower than 45° C.

3. The crystalline polyglycolic acid according to claim 1, which has been subjected to heat history at a temperature higher by not lower than 38° C. than the melting point Tm.

4. The crystalline polyglycolic acid according to claim 1, which has been subjected to heat history within a temperature range of from the melting point Tm+38° C. to Tm+100° C.

5. The crystalline polyglycolic acid according to claim 1, which is in the form of pellets.

6. A process for producing crystalline polyglycolic acid, wherein
   (a) a difference (Tm–$Tc_2$) between the melting point Tm defined as a maximum point of an endothermic peak attributable to melting of a crystal detected in the course of heating at a heating rate of 10° C./min by means of a differential scanning calorimeter and the crystallization temperature $Tc_2$ defined as a maximum point of an exothermic peak attributable to crystallization detected in the course of cooling from a molten state at a cooling rate of 10° C./min is not lower than 35° C., and
   (b) a difference ($Tc_1$–Tg) between the crystallization temperature $Tc_1$ defined as a maximum point of an exothermic peak attributable to crystallization detected in the course of heating an amorphous sheet at a heating rate of 10° C./min by means of a differential scanning calorimeter and the glass transition temperature Tg defined as a temperature at a second-order transition point on a calorimetric curve detected in said course is not lower than 40° C.

the process comprising applying heat history to crystalline polyglycolic acid at a temperature of not lower than the melting point Tm of the crystalline polyglycolic acid+38° C.

7. The production process of the crystalline polyglycolic acid according to claim 6, which comprises melting the crystalline polyglycolic acid within a temperature range of from the melting point Tm+38° C. to Tm+100° C. to apply the heat history to the polyglycolic acid, and then pelletizing the polyglycolic acid.

8. The production process of the crystalline polyglycolic acid according to claim 6, which comprises preparing polyglycolic acid through the steps of:
   (1) subjecting glycolide to ring-opening polymerization in a molten state,
   (2) converting the polymer formed from the molten state to a solid state, and
   (3) subjecting the polymer in the solid state to solid phase polymerization if desired, and then applying heat history to the crystalline polyglycolic acid in the solid state through the step of:
   (4) melting and kneading the polyglycolic acid within a temperature range of from the melting point Tm of the polyglycolic acid+38° C. to Tm+100° C.

9. A polyglycolic acid composition comprising crystalline polyglycolic acid and a heat stabilizer, wherein the crystalline polyglycolic acid is crystalline polyglycolic acid; wherein
   (a) a difference (Tm–$Tc_2$) between the melting point Tm defined as a maximum point of an endothermic peak attributable to melting of a crystal detected in the course of heating at a heating rate of 10° C./min by means of a differential scanning calorimeter and the crystallization temperature $Tc_2$ defined as a maximum point of an exothermic peak attributable to crystallization detected in the course of cooling from a molten state at a cooling rate of 10° C./min is not lower than 35° C., and
   (b) a difference ($Tc_1$–Tg) between the crystallization temperature $Tc_1$ defined as a maximum point of an exothermic peak attributable to crystallization detected in the course of heating an amorphous sheet at a heating rate of 10° C./min by means of a differential scanning calorimeter and the glass transition temperature Tg defined as a temperature at a second-order transition point on a calorimetric curve detected in said course is not lower than 40° C., and
   wherein
   (c) a difference ($T_2$–$T_1$) between the temperature $T_2$ at 3%-weight loss on heating of the polyglycolic acid composition and the temperature $T_1$ at 3%-weight loss on heating of the polyglycolic acid is not lower than 5° C.

10. The polyglycolic acid composition according to claim 9, wherein the heat stabilizer is at least one compound selected from the group consisting of heavy metal deactivators, phosphates having a pentaerythritol skeleton structure, phosphorus compounds having at least one hydroxyl group and at least one long-chain alkyl ester group, and metal carbonates.

11. A polyglycolic acid composition comprising crystalline polyglycolic acid and a heat stabilizer, wherein a difference $(T_2-T_1)$ between the temperature $T_2$ at 3%-weight loss on heating of the polyglycolic acid composition and the temperature $T_1$ at 3%-weight loss on heating of the crystalline polyglycolic acid is not lower than 5° C., and wherein the heat stabilizer is at least one compound selected from the group consisting of heavy metal deactivators, phosphates having a pentaerythritol skeleton structure, and phosphorus compounds having at least one hydroxyl group and at least one long-chain alkyl ester group.

12. The polyglycolic acid composition according to claim 11, wherein a proportion of the heat stabilizer incorporated is 0.001 to 5 parts by weight per 100 parts by weight of the crystalline polyglycolic acid.

13. The polyglycolic acid composition according to claim 11, wherein the heat stabilizer is a phosphorus compound having at least one hydroxyl group and at least one long-chain alkyl ester group and is mono- or di-stearyl acid phosphate represented by the formula (5):

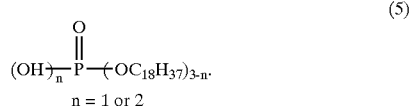

n = 1 or 2

14. A process for producing a polyglycolic acid composition which comprises crystalline polyglycolic acid; wherein (i) a difference $(Tm-Tc_2)$ between the melting point Tm defined as a maximum point of an endothermic peak attributable to melting of a crystal detected in the course of heating at a heating rate of 10° C./min by means of a differential scanning calorimeter and the crystallization temperature $Tc_2$ defined as a maximum point of an exothermic peak attributable to crystallization detected in the course of cooling from a molten state at a cooling rate of 10° C./min is not lower than 35° C., and wherein (ii) a difference $(T_2-T_1)$ between the temperature $T_2$ at 3%-weight loss on heating of the polyglycolic acid composition and the temperature $T_1$ at 3 %-weight loss on heating of the polyglycolic acid is not lower than 5° C., the process comprising applying heat history to a polyglycolic acid composition containing crystalline polyglycolic acid and a heat stabilizer at a temperature of not lower than the melting point Tm of the crystalline polyglycolic acid+38° C.

15. The production process of the polyglycolic acid composition according to claim 18, which comprises preparing crystalline polyglycolic acid through the steps of:

(1) subjecting glycolide to ring-opening polymerization in a molten state, (2) converting the polymer formed from the molten state to a solid state, and (3) subjecting the polymer in the solid state to solid phase polymerization if desired, and then applying heat history to the crystalline polyglycolic acid in the solid state through the step of:

(4) melting and kneading the polyglycolic acid within a temperature range of from the melting point Tm of the crystalline polyglycolic acid+38° C. to Tm+100° C.

16. A process for controlling the crystallinity of crystalline polyglycolic acid, comprising applying heat history to the crystalline polyglycolic acid by melting and kneading the polyglycolic acid for 1 to 100 minutes within a temperature range higher than the melting point Tm thereof, but not higher than Tm+100° C.

17. A polyglycolic acid composition comprising crystalline polyglycolic acid and a heat stabilizer, wherein a difference $(T_2-T_2)$ between the temperature $T_2$ at 3%-weight loss on heating of the polyglycolic acid composition and the temperature $T_1$ at 3%-weight loss on heating of the crystalline polyglycolic acid is not lower than 5° C., and wherein the heat stabilizer is 2-hydroxy-N-1H-1,2,4-triazol-3-yl-benzamide or bis[2-(2-hydroxybenzoyl)-hydrazin] dodecanediacid.

18. A polyglycolic acid composition comprising crystalline polyglycolic acid and a heat stabilizer, wherein a difference $(T_2-T_1)$ between the temperature $T_2$ at 3%-weight loss on heating of the polyglycolic acid composition and the temperature $T_1$ at 3%-weight loss on heating of the crystalline polyglycolic acid is not lower than 5° C., and wherein the heat stabilizer is cyclic neopentanetetraylbis (2,6-di-tert-butyl-4-methylphenyl)phosphite represented by the formula (1):

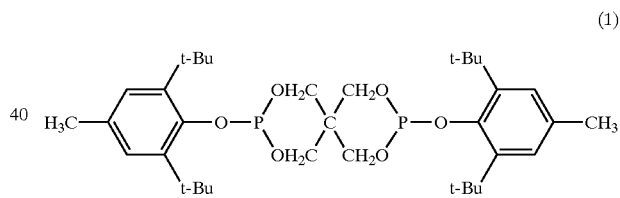

cyclic neopentanetetraylbis(2,6-di-tert-butylphenyl)-phosphate represented by the formula (2):

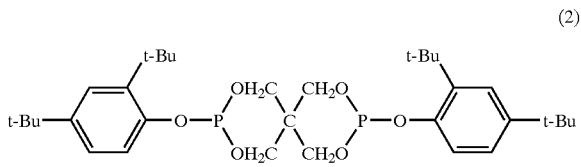

a phosphite antioxidant represented by the formula (3):

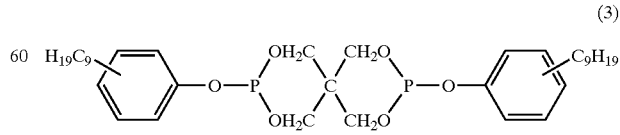

or a phosphite antioxidant represented by the formula (4):

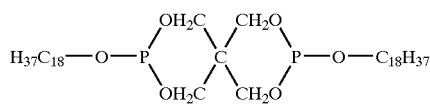
(4)

19. The crystalline polyglycolic acid according to claim 1, wherein the difference ($Tc_1-Tg$) between the crystallization temperature $Tc_1$ and the glass transition temperature Tg is not lower than 50° C.

20. The crystalline polyglycolic acid according to claim 2, wherein the difference ($Tc_1-Tg$) between the crystallization temperature $Tc_1$ and the glass transition temperature Tg is not lower than 50° C.

21. The production process of the crystalline polyglycolic acid according to claim 6, wherein the difference ($Tc_1-Tg$) is not lower than 50° C.

22. The polyglycolic acid composition according to claim 11, wherein a proportion of the heat stabilizer incorporated is 0.005 to 1 parts by weight per 100 parts by weight of the crystalline polyglycolic acid.

* * * * *